(12) United States Patent
Kim

(10) Patent No.: US 9,397,511 B2
(45) Date of Patent: Jul. 19, 2016

(54) SAFETY DEVICE FOR BATTERY PACK HAVING INSERTED-TYPED DISCONNECT MEMBER

(71) Applicant: LG CHEM, LTD., Seoul (KR)

(72) Inventor: Taeyeop Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 121 days.

(21) Appl. No.: 14/447,030

(22) Filed: Jul. 30, 2014

(65) Prior Publication Data

US 2015/0037643 A1 Feb. 5, 2015

(30) Foreign Application Priority Data

Jul. 31, 2013 (KR) ........................ 10-2013-0090935

(51) Int. Cl.
*H02J 7/00* (2006.01)
*H01M 10/42* (2006.01)
*H01H 85/22* (2006.01)
*H01H 85/02* (2006.01)

(52) U.S. Cl.
CPC .............. *H02J 7/0031* (2013.01); *H01H 85/22* (2013.01); *H01M 10/425* (2013.01); *H01M 10/4207* (2013.01); *H01H 2085/025* (2013.01); *H01M 2010/4271* (2013.01); *H01M 2200/00* (2013.01)

(58) Field of Classification Search
CPC ............ H01H 2085/025; H01H 85/22; H01M 10/4207; H01M 10/425; H01M 2010/4271; H01M 2200/00; H02J 7/0031
See application file for complete search history.

(56) References Cited

U.S. PATENT DOCUMENTS

| | | | |
|---|---|---|---|
| 4,555,451 A | 11/1985 | Harrod et al. | |
| 5,036,427 A * | 7/1991 | Krom .................. | H02B 11/127 200/50.17 |
| 5,643,693 A | 7/1997 | Hill et al. | |
| 2005/0029867 A1* | 2/2005 | Wood .................. | H02J 1/08 307/10.1 |
| 2005/0098419 A1 | 5/2005 | Matsui et al. | |
| 2005/0281002 A1* | 12/2005 | Miller .................. | H01M 2/1077 361/716 |
| 2007/0087266 A1 | 4/2007 | Bourke et al. | |
| 2010/0207717 A1 | 8/2010 | Head | |
| 2011/0215742 A1* | 9/2011 | Gabbie .................. | H02K 7/14 318/17 |
| 2012/0058382 A1 | 3/2012 | Carignan et al. | |

(Continued)

FOREIGN PATENT DOCUMENTS

| | | |
|---|---|---|
| GB | 2 330 253 A | 4/1999 |
| WO | WO 2012/148209 A2 | 11/2012 |
| WO | WO 2012/158185 A1 | 11/2012 |

(Continued)

*Primary Examiner* — Carlos Barcena
(74) *Attorney, Agent, or Firm* — Birch, Stewart, Kolasch & Birch, LLP

(57) ABSTRACT

Disclosed herein is a safety device mounted in a battery pack including one or more battery modules, each of which includes a plurality of unit modules electrically connected to each other, to interrupt a flow of electric current in the battery pack in an abnormal state of the battery pack, the safety device including a safety device case provided with a connection terminal connected to a main cable of the battery pack and a circuit breaker unit mounted into the safety device case from an outside of the battery pack in an insertion fashion such that the circuit breaker unit is electrically connected to the connection terminal in a state in which the circuit breaker unit is mounted in the safety device case and the circuit breaker unit is electrically disconnected from the connection terminal in a state in which the circuit breaker unit is separated from the safety device case.

20 Claims, 3 Drawing Sheets

(56) References Cited

U.S. PATENT DOCUMENTS

2014/0134464 A1    5/2014    Jang et al.
2014/0162497 A1    6/2014    Lim

FOREIGN PATENT DOCUMENTS

| WO | WO 2013/069756 A1 | 5/2013 |
| WO | WO 2013/090649 A1 | 6/2013 |

\* cited by examiner

SAFETY DEVICE FOR BATTERY PACK HAVING INSERTED-TYPED DISCONNECT MEMBER

TECHNICAL FIELD

The present invention relates to a safety device for battery packs including an insertion type circuit breaker unit.

BACKGROUND ART

Recently, a secondary battery, which can be charged and discharged, has been widely used as an energy source for wireless mobile devices. In addition, the secondary battery has attracted considerable attention as a power source for electric vehicles (EV), hybrid electric vehicles (NEV), and plug-in hybrid electric vehicles (Plug-in HEV), which have been developed to solve problems, such as air pollution, caused by existing gasoline and diesel vehicles using fossil fuels.

In addition, technology related to a power storage device that stores electric power and stably supplies the stored electric power to a power system when needed has been developed. The power storage device is a device that stores electric power when power demand is low and supplies the stored electric power in case of overload or emergency. The power storage device provides the effect of improving quality of electric power and energy efficiency. In particular, a market for a household power storage device and a middle-sized industrial or commercial power storage device has been rapidly expanding as the power storage devices are related to smart grid technology.

Meanwhile, for a battery pack to provide output and capacity required by a predetermined apparatus or device, it is necessary for the battery pack to be configured to have a structure in which a plurality of unit cells or a plurality of battery modules, each of which includes a plurality of unit cells, is electrically connected to each other in series or in parallel. In addition, it is necessary for the battery pack to be configured to have a structure which is easily extendable and stable as the capacity of the battery pack is increased.

Particularly, in a case in which a plurality of battery modules is used to constitute the battery pack, a plurality of members, such as bus bars or power connection cables, for mechanical fastening and electrical connection between the battery modules is generally needed and, as a result, a process of assembling such members is very complicated. Furthermore, in a case in which it is necessary to extend the battery pack, it is difficult to modify the structure of the battery pack and it is necessary to add a plurality of parts, thereby increasing manufacturing cost.

In addition, the battery pack is configured to have a structure in which a plurality of battery modules is combined. In a case in which overvoltage is applied to some of the battery modules, overcurrent flows in some of the battery modules, or some of the battery modules overheat, therefore, safety and operation efficiency of the battery pack are seriously concerned. For this reason, it is necessary to provide a safety system, such as a battery management system (BMS), which detects such overvoltage, overcurrent, or the overheating to interrupt the flow of electric current in the battery pack or operate a cooling device. However, the provision of several sensors and a plurality of wires as well as the BMS increases manufacturing cost and complicates a manufacturing process.

Meanwhile, technology to interrupt the flow of electric current using a breaker or a fuse in an abnormal state, such as overcharge, overdischarge, or overcurrent, of the battery pack as described above has been used. For the breaker, however, the volume of the breaker is increased as higher voltage or higher electric power is required. For this reason, it is difficult to apply a large-sized breaker to a battery pack requiring high energy density. In addition, the capacity of the battery pack is reduced.

For the fuse, on the other hand, it is difficult and troublesome to replace the fuse. Specifically, in a case in which the fuse is mounted such that the fuse is exposed in order to easily replace the fuse, a short circuit with an adjacent electric power line may be caused. In addition, an accident may occur due to an error in work during a process of separating and mounting the fuse in a structure in which a plurality of parts and cables is complexly arranged in the battery pack. Furthermore, when a case having a fuse for safety disposed therein is used, it is difficult and troublesome to replace the fuse.

Consequently, there is a high necessity for technology to fundamentally solve the above problems.

DISCLOSURE

Technical Problem

Therefore, the present invention has been made to solve the above problems, and other technical problems that have yet to be resolved.

It is an object of the present invention to provide a safety device for battery packs configured to have a structure in which a circuit breaker unit can be easily separated from or mounted into the safety device.

It is another object of the present invention to provide a safety device for battery packs that is capable of preventing the occurrence of an accident during a process of separating and mounting a circuit breaker unit, thereby improving safety.

Technical Solution

In accordance with one aspect of the present invention, the above and other objects can be accomplished by the provision of a safety device mounted in a battery pack including one or more battery modules, each of which includes a plurality of unit modules electrically connected to each other, to interrupt a flow of electric current in the battery pack in an abnormal state of the battery pack, the safety device including a safety device case provided with a connection terminal connected to a main cable of the battery pack and a circuit breaker unit mounted into the safety device case from an outside of the battery pack in an insertion fashion such that the circuit breaker unit is electrically connected to the connection terminal in a state in which the circuit breaker unit is mounted in the safety device case and the circuit breaker unit is electrically disconnected from the connection terminal in a state in which the circuit breaker unit is separated from the safety device case.

As described above, the safety device for battery packs according to the present invention is configured to have a structure in which the circuit breaker unit, to interrupt the flow of electric current in the battery pack in an abnormal state of the battery pack, can be easily inserted into and separated from the safety device case. Consequently, it is possible to easily inspect or replace the circuit breaker unit.

In addition, it is possible to achieve electrical connection between the circuit breaker unit and the safety device case simply by inserting the circuit breaker unit into the safety device case. On the other hand, it is possible to achieve electrical disconnection between the circuit breaker unit and the safety device case simply by separating the circuit breaker unit from the safety device case. Consequently, it is not necessary to perform an additional electrical connection or disconnection process during inspection or replacement of the circuit breaker unit.

In a concrete example, a circuit breaker to interrupt the flow of electric current in the battery pack in an abnormal state, such as overvoltage, overcurrent, or the overheating, of the battery pack may be mounted in the circuit breaker unit. For example, it may be possible to use a fuse which is cut off when overcurrent flows in the battery pack to interrupt the flow of electric current in the battery pack. However, the present invention is not limited thereto. Parts made of various materials and formed in various shapes may be used as the circuit breaker.

As previously described, the circuit breaker unit is mounted into the safety device case in an insertion fashion. As an example of this structure, the circuit breaker unit and the safety device case may have corresponding rail structures such that the circuit breaker unit is mounted into the safety device case in a sliding fashion through the rail structures.

Meanwhile, the safety device case may be provided at the front thereof with an insertion hole, through which the circuit breaker unit is inserted, such that the circuit breaker unit is inserted and mounted into the safety device case.

In addition, the safety device case may be provided at the front thereof with a circuit breaker unit holder to hold a state in which the circuit breaker unit is mounted in the safety device case. That is, it is possible to separate the circuit breaker unit from the safety device case by unlocking the circuit breaker unit holder and to stably hold a state in which the circuit breaker unit is mounted in the safety device case by fully inserting the circuit breaker unit into the safety device case and locking the circuit breaker unit holder.

In addition, the circuit breaker unit may be provided at a side thereof opposite to an insertion side thereof inserted into the safety device case with a handle to allow easy insertion and separation of the circuit breaker unit into and from the safety device case.

In a concrete example, the outside of the circuit breaker unit on the insertion side thereof inserted into the safety device case and the inside of the safety device case opposite to the outside of the circuit breaker unit may be electrically connected to each other by mechanical coupling therebetween.

Specifically, any one selected from the outside of the circuit breaker unit on the insertion side thereof inserted into the safety device case and the inside of the safety device case opposite to the outside of the circuit breaker unit may be provided with a fastening member and the other selected from the outside of the circuit breaker unit on the insertion side thereof inserted into the safety device case and the inside of the safety device case opposite to the outside of the circuit breaker unit may be provided with a fastening groove such that the circuit breaker unit is electrically connected to the safety device case through coupling between the fastening member and the fastening groove. However, the coupling structure between the circuit breaker unit and the safety device case is not particularly restricted so long as the circuit breaker unit is electrically connected to the safety device case through mechanical coupling between the fastening member and the fastening groove. That is, the circuit breaker unit and the safety device case may have various coupling structures therebetween.

For example, the circuit breaker unit may include a circuit breaker mounted in a circuit breaker unit case configured to have a rectangular parallelepiped structure open at the top thereof to interrupt the flow of electric current in the battery pack when overcurrent flows in the battery pack or overvoltage is applied to the battery pack. In addition, the fastening groove or the fastening member may be formed at one side of the circuit breaker unit.

Meanwhile, the safety device case may have a battery management system (BMS) circuit board to monitor and control operation of the battery pack mounted therein. Under control of the BMS, therefore, the battery pack may perform efficient operation and interrupt the flow of electric current therein in an abnormal state of the battery pack.

In addition, the safety device case may be provided at the front thereof with a handle to allow the safety device to be easily mounted into the battery pack and to allow the safety device to be transported.

In accordance with another aspect of the present invention, there is provided a battery pack including the safety device with the above-stated construction.

For example, the battery pack may be configured to have a structure in which a battery module stack including a plurality of stacked battery modules is mounted in a rack and the battery modules are electrically connected to each other via a connection member. The safety device may be connected to a main cable in the battery pack to interrupt the flow of electric current in the battery pack in an abnormal state of the battery pack.

In accordance with a further aspect of the present invention, there is provided a device including the battery pack with the above-stated construction.

Specifically, the device may be a household power supply, a power supply for public facilities, a power supply for large-sized stores, a power supply for emergency, a power supply for computer rooms, a portable power supply, a power supply for medical facilities, a power supply for fire extinguishing facilities, a power supply for alarm facilities, a power supply for refuge facilities, an electric vehicle, a hybrid electric vehicle, or a plug-in hybrid electric vehicle.

The structures and manufacturing methods of the above-specified devices are well known in the art to which the present invention pertains and thus a detailed description thereof will be omitted.

Effects of the Invention

As is apparent from the above description, the safety device for battery packs according to the present invention is configured to have a structure in which the circuit breaker unit, to interrupt the flow of electric current in the battery pack in an abnormal state of the battery pack, can be easily inserted into and separated from the safety device case. Consequently, it is possible to easily inspect or replace the circuit breaker unit. In addition, it is possible to achieve electrical connection between the circuit breaker unit and the safety device case simply by inserting the circuit breaker unit into the safety device case. Consequently, it is not necessary to perform an additional electrical connection process during inspection or replacement of the circuit breaker unit.

Furthermore, in the safety device for battery packs according to the present invention, it is possible to prevent insertion or separation of the circuit breaker unit into or from the safety device case from being disturbed by cables, thereby improving safety.

BRIEF DESCRIPTION OF DRAWINGS

The above and other objects, features and other advantages of the present invention will be more clearly understood from the following detailed description taken in conjunction with the accompanying drawings, in which.

DETAILED DESCRIPTION OF THE INVENTION

Now, exemplary embodiments of the present invention will be described in detail with reference to the accompanying drawings. It should be noted, however, that the scope of the present invention is not limited by the illustrated embodiments.

Figure 1:
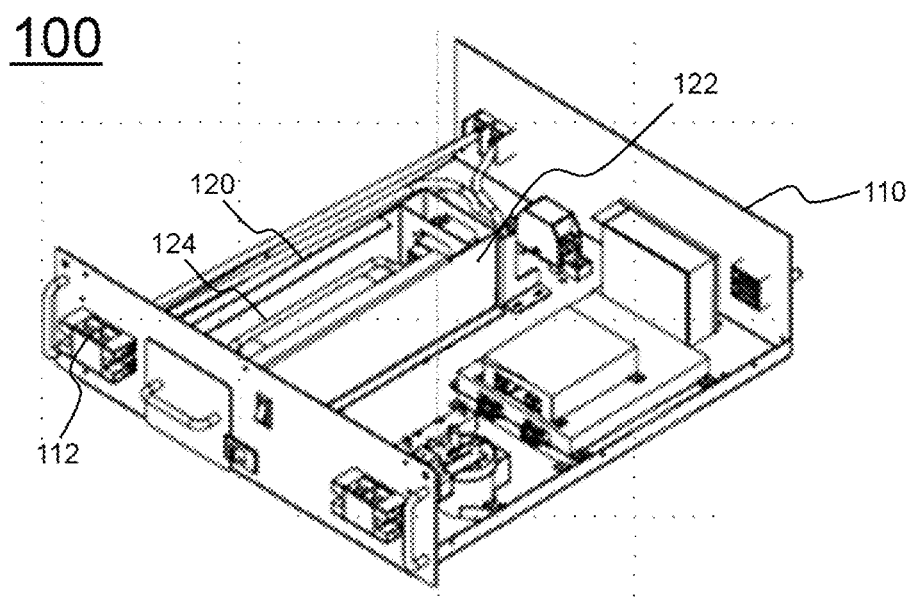
FIG. 1 is a perspective view showing a safety device for battery packs according to an embodiment of the present invention.
Figure 2:
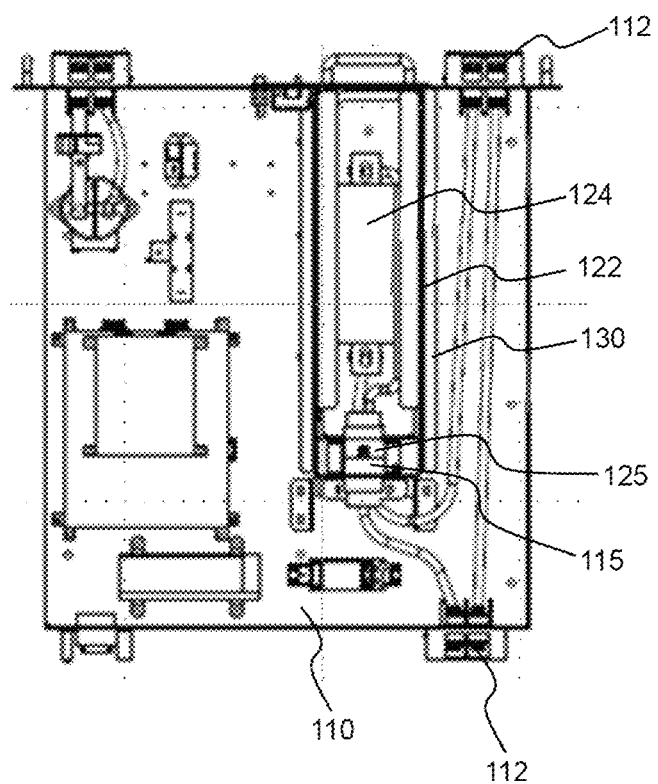
FIG. 2 is a plan view of the safety device for battery packs shown in FIG. 1.

FIG. 1 is a perspective view showing a safety device for battery packs according to an embodiment of the present invention and FIG. 2 is a plan view of the safety device for battery packs shown in FIG. 1.

Referring to FIGS. 1 and 2, a safety device 100 for battery packs includes a safety device case 110 and a circuit breaker unit 120. The safety device case 110 is provided with a connection terminal 112 connected to a main cable of a battery pack (not shown), in which the safety device 100 is mounted. The circuit breaker unit 120 is mounted into the safety device case 110 in an insertion fashion. The circuit breaker unit 120 is electrically connected to the connection terminal 112 in a state in which the circuit breaker unit 120 is mounted in the safety device case 110.

The circuit breaker unit 120 and the safety device case 110 have corresponding rail structures 130 such that the circuit breaker unit 120 is mounted into the safety device case 110 in a sliding fashion through the rail structures 130.

The circuit breaker unit 120 includes a fuse 124 mounted in a circuit breaker unit case 122 configured to have a rectangular parallelepiped structure open at the top thereof such that the fuse 124 is cut off to interrupt the flow of electric current in the battery pack when overcurrent flows in the battery pack. The circuit breaker unit case 122 is provided at one side thereof with a fastening member 125. The safety device case 110 is provided with a fastening groove 115, into which the fastening member 125 of the circuit breaker unit 120 is fastened. When the circuit breaker unit 120 is inserted and mounted into the safety device case 110, therefore, the circuit breaker unit 120 is electrically connected to the safety device case 110 through mechanical coupling between the fastening member 125 and the fastening groove 115.

Consequently, it is possible to achieve electrical connection between the circuit breaker unit 120 and the safety device case 110 simply by inserting the circuit breaker unit 120 into the safety device case 110. On the other hand, it is possible to achieve electrical disconnection between the circuit breaker unit 120 and the safety device case 110 simply by separating the circuit breaker unit 120 from the safety device case 110.

Figure 3:
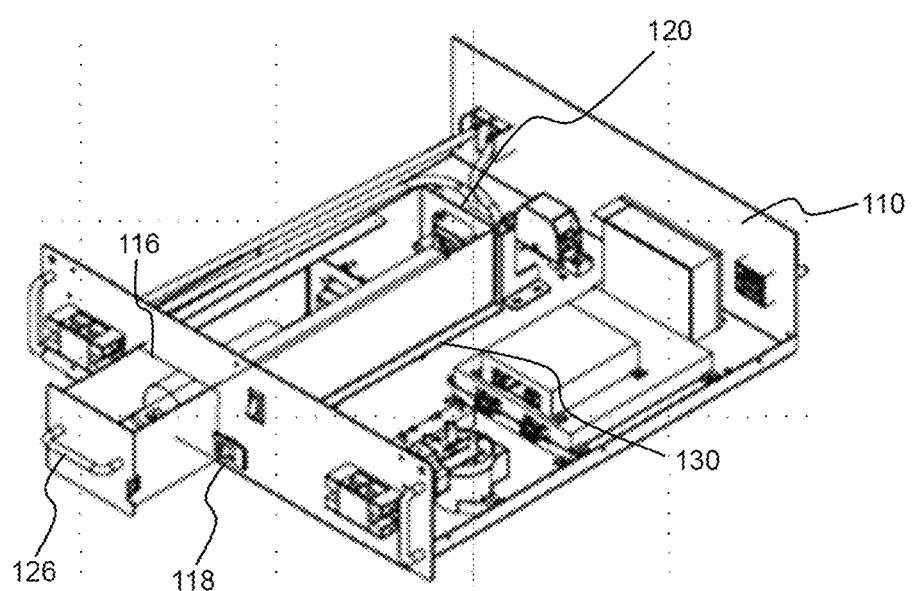
FIG. 3 is a perspective view showing a process of separating a circuit breaker unit from the safety device for battery packs shown in FIG. 1.

FIG. 3 is a perspective view showing a process of separating the circuit breaker unit from the safety device for battery packs shown in FIG. 1.

Referring to FIG. 3 together with FIG. 1, the safety device case 110 is provided at the front thereof with an insertion hole 116, through which the circuit breaker unit 120 is inserted, such that the circuit breaker unit 120 is inserted and mounted into the safety device case 110.

In addition, the safety device case 110 is provided at the front thereof with a circuit breaker unit holder 118 to hold a state in which the circuit breaker unit 120 is mounted in the safety device case 110. When the circuit breaker unit 120 is fully inserted into the safety device case 110 and the circuit breaker unit holder 118 is locked, therefore, it is possible to stably hold a state in which the circuit breaker unit 120 is mounted in the safety device case 110. On the other hand, when the circuit breaker unit holder 118 is unlocked and the circuit breaker unit 120 is withdrawn from the safety device case 110, it is possible to separate the circuit breaker unit 120 from the safety device case 110.

The circuit breaker unit 120 is provided at a side thereof opposite to an insertion side thereof inserted into the safety device case 110 with a handle 126 to allow easy insertion and separation of the circuit breaker unit 120 into and from the safety device case 110.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A safety device mounted in a battery pack comprising one or more battery modules, each of which comprises a plurality of unit modules electrically connected to each other, to interrupt a flow of electric current in the battery pack in an abnormal state of the battery pack, the safety device comprising:

a safety device case provided with a connection terminal connected to a main cable of the battery pack; and a circuit breaker unit mounted into the safety device case from an outside of the battery pack in an insertion fashion such that the circuit breaker unit is electrically connected to the connection terminal in a state in which the circuit breaker unit is mounted in the safety device case and the circuit breaker unit is electrically disconnected from the connection terminal in a state in which the circuit breaker unit is separated from the safety device case.

2. The safety device according to claim 1, wherein the circuit breaker unit has a fuse mounted therein.

3. The safety device according to claim 1, wherein the circuit breaker unit and the safety device case have corresponding rail structures such that the circuit breaker unit is mounted into the safety device case in a sliding fashion through the rail structures.

4. The safety device according to claim 1, wherein the safety device case is provided at a front thereof with an insertion hole, through which the circuit breaker unit is inserted.

5. The safety device according to claim 1, wherein the safety device case is provided at a front thereof with a circuit breaker unit holder to hold a state in which the circuit breaker unit is mounted in the safety device case.

6. The safety device according to claim 1, wherein the circuit breaker unit is provided at a side thereof opposite to an insertion side thereof inserted into the safety device case with a handle to allow easy insertion and separation of the circuit breaker unit into and from the safety device case.

7. The safety device according to claim 1, wherein an outside of the circuit breaker unit on an insertion side thereof inserted into the safety device case and an inside of the safety device case opposite to the outside of the circuit breaker unit are electrically connected to each other by mechanical coupling therebetween.

8. The safety device according to claim 7, wherein any one selected from the outside of the circuit breaker unit on the insertion side thereof inserted into the safety device case and the inside of the safety device case opposite to the outside of the circuit breaker unit is provided with a fastening member, and the other selected from the outside of the circuit breaker unit on the insertion side thereof inserted into the safety device case and the inside of the safety device case opposite to the outside of the circuit breaker unit is provided with a fastening groove such that the circuit breaker unit is electrically connected to the safety device case through coupling between the fastening member and the fastening groove.

9. The safety device according to claim 1, wherein the circuit breaker unit comprises a circuit breaker mounted in a circuit breaker unit case configured to have a rectangular parallelepiped structure open at a top thereof to interrupt the flow of electric current in the battery pack when overcurrent flows in the battery pack or overvoltage is applied to the battery pack.

10. The safety device according to claim 1, wherein the safety device case has a battery management system (BMS) circuit board to monitor and control operation of the battery pack mounted therein.

11. The safety device according to claim 1, wherein the safety device case is provided at a front thereof with a handle to allow the safety device to be mounted and transported.

12. A battery pack comprising a safety device according to claim 1.

13. The battery pack according to claim 12, wherein the battery pack is configured to have a structure in which a battery module stack comprising a plurality of stacked battery modules is mounted in a rack, and the battery modules are electrically connected to each other via a connection member.

14. A device comprising a battery pack according to claim 13.

15. The device according to claim 14, wherein the device is a household power supply, a power supply for public facilities, a power supply for large-sized stores, a power supply for emergency, a power supply for computer rooms, a portable power supply, a power supply for medical facilities, a power supply for fire extinguishing facilities, a power supply for alarm facilities, a power supply for refuge facilities, an electric vehicle, a hybrid electric vehicle, or a plug-in hybrid electric vehicle.

16. A safety device mounted in a battery pack, the safety device comprising:
 a safety device case having a bottom wall and side wall;
 a connection terminal in a side wall;
 an opening in a side wall;
 a circuit breaker unit mounted into the safety device case; and
 corresponding rail structures attached to the circuit breaker unit and the safety device case allowing the circuit breaker unit to be inserted into and retracted from the safety device case through the opening,
 wherein the circuit breaker unit is electrically connected to the connection terminal when the circuit breaker unit is inserted in the safety device case and the circuit breaker unit is electrically disconnected from the connection terminal when the circuit breaker unit is retracted from the safety device case.

17. The safety device according to claim 16, wherein the circuit breaker unit has a fuse mounted therein.

18. The safety device according to claim 16, further comprising an electrical cable extending within the housing between the connection terminal and the circuit breaker unit.

19. The safety device according to claim 16, further comprising a circuit board unit holder on the side wall next to the insertion hole.

20. The safety device according to claim 16, wherein the connection terminal and the opening are in the same side wall.

* * * * *